S. MAYER.
URN.
APPLICATION FILED DEC. 23, 1909.
994,767.
Patented June 13, 1911.
2 SHEETS—SHEET 1.
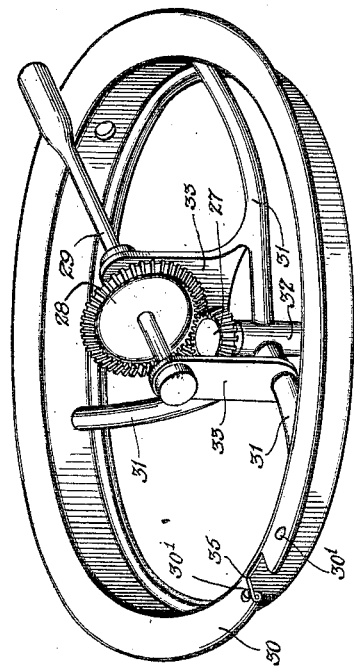
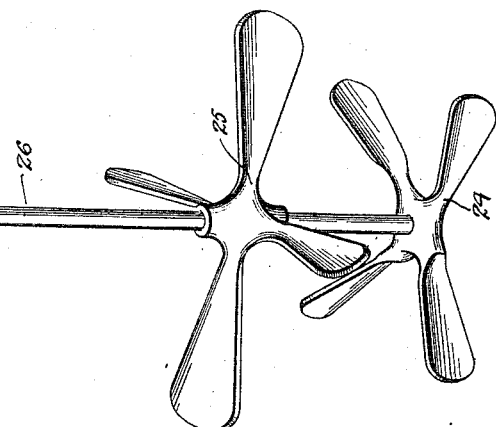
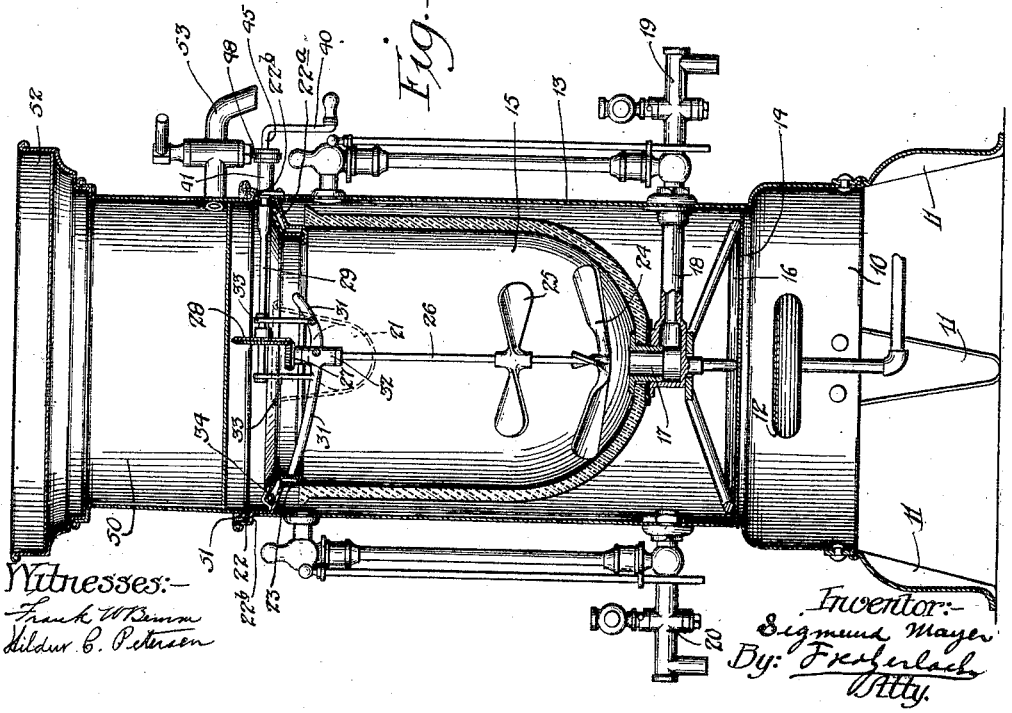
Witnesses:—
Frank W. Bemm
Hildur C. Petersen
Inventor:—
Sigmund Mayer
By: Fritzerlach
Atty.

S. MAYER.
URN.
APPLICATION FILED DEC. 23, 1909.
994,767.
Patented June 13, 1911.
2 SHEETS—SHEET 2.
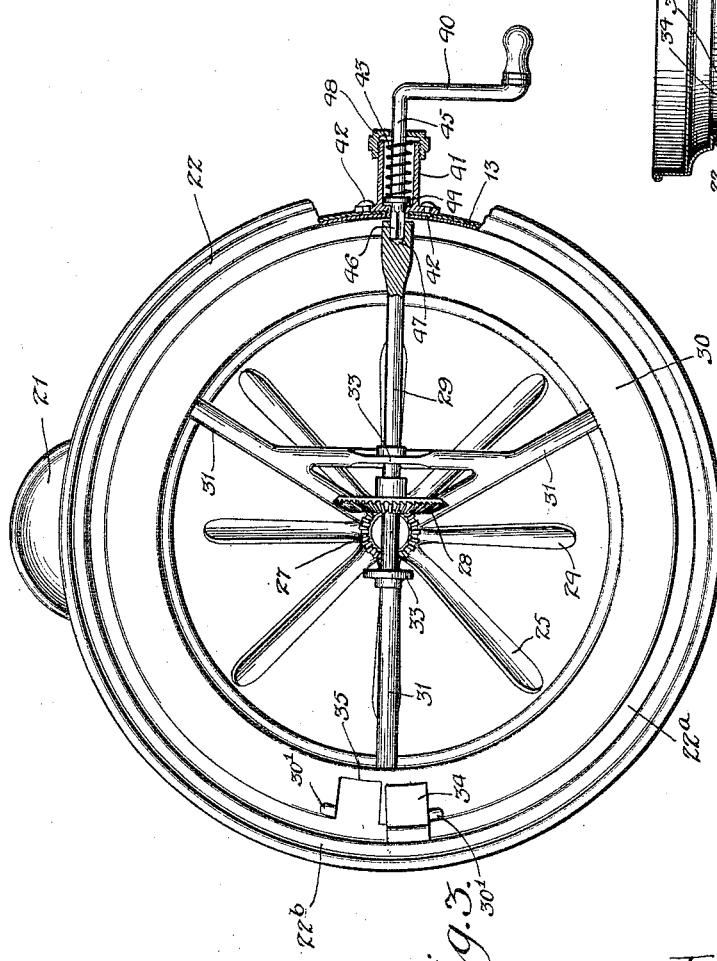
Witnesses:
Frank W. Bemm
Hildur C. Peterson
Inventor:
Sigmund Mayer
By: Fred Gerlach
Atty.

UNITED STATES PATENT OFFICE.

SIGMUND MAYER, OF CHICAGO, ILLINOIS, ASSIGNOR TO ALBERT PICK & COMPANY, OF CHICAGO, ILLINOIS, A CORPORATION OF ILLINOIS.

URN.

994,767. Specification of Letters Patent. Patented June 13, 1911.

Application filed December 23, 1909. Serial No. 534,724.

*To all whom it may concern:*

Be it known that I, SIGMUND MAYER, a resident of Chicago, in the county of Cook and State of Illinois, have invented certain new and useful Improvements in Urns, of which the following is a full, clear, and exact description.

The invention relates to urns for coffee, chocolate, etc.

In practice it is frequently desired to adapt an urn either for making coffee or chocolate or other beverages. When the urn is to be used for making coffee, it is customary to suspend the ground coffee in a bag or receptacle in a reservoir containing water, this receptacle being removable for convenience in cleaning and no means for stirring or agitating the coffee is necessary. When, however, the urn is to be used for another liquid, such as chocolate, in which the material is mixed with hot water, it is necessary that a device should be provided for stirring the contents of the urn to render the liquid drawn from the urn of uniform character. When the urn is used for chocolate, it is also desirable to have associated therewith a reservoir for hot milk to mix with the chocolate drawn from the urn, to avoid the necessity of providing a separate heater for the milk or liquid to be added to the chocolate drawn from the urn.

It has heretofore been proposed to mount a stirring device in the cover of the urn and to provide a handle on top of the urn for operating the stirring-device. In this construction, a receptacle for milk could not be employed on top of the urn, because the handle for operating the stirring device would be rendered inaccessible and the handle at the top of the urn would be, in most instances, inconvenient of access.

The present invention designs to provide an improved urn which is adapted for making coffee or for making chocolate or a beverage in which the material is mixed with a liquid and requires stirring or agitation and in which the means for operating the stirring device is disposed, so that the top of the urn may be utilized for heating a liquid to be added, such as milk, while the stirring-device remains operative in the urn.

Further, the invention designs to provide an improved combined chocolate and coffee urn in which the device for operating the stirring-device is conveniently disposed at the side of the urn and the stirring-device is removably held in the urn, so that it may be withdrawn and a coffee-receptacle substituted therefor.

The invention still further designs to provide an urn of improved construction.

The invention consists in the several novel features hereinafter set forth and more particularly defined by claim at the conclusion hereof.

In the drawings: Figure 1 is a central vertical section of an urn embodying the invention, being shown as adapted for making chocolate or a beverage made of material admixed with a liquid. Fig. 2 is a perspective of the stirring-device and the means for removably supporting it in the urn. Fig. 3 is a plan, the top-receptacle of the urn being removed, parts being shown in section. Fig. 4 is a central section of the urn when it is adapted for making coffee or a beverage in which the stirring-device is not necessary.

The improved urn comprises a base 10 which is sustained by legs 11 and in which a suitable heater 12 is disposed. A jacket 13 and 14 mounted upon the base form a reservoir for containing water, which will be heated by the burner 12 and will circulate around and heat a receptacle 15 which is disposed within the jacket and adapted to contain coffee or chocolate as may be desired. Receptacle 15 is mounted upon a frame 16 resting on the bottom 14 and is provided with a suitable bottom-outlet 17 to which is connected a pipe 18 leading to a suitable cock 19 through which the contents of the receptacle 15 may be withdrawn, as well understood in the art. The reservoir is provided with a cock 20, whereby water may be withdrawn and a suitable inlet 21 is provided to permit water to be poured into the reservoir, as well understood in the art. A ring 22 is secured to the top of jacket 13 and is provided at its lower end with a downwardly extending flange 23 which fits snugly into the receptacle 15 to close the space between the top of the hot water reservoir and said receptacle.

As shown in Fig. 1, the urn is adapted for making chocolate and is equipped with a stirring-device whereby the mixed material and liquid used in making chocolate may be stirred from time to time, or before it is withdrawn from cock 19. This stirring-device comprises suitable blades 24 and 25 secured to the lower end of a central vertically extending shaft 26. To the upper end of this shaft is secured a pinion 27 which meshes with a gear-wheel 28 on a horizontally extending shaft 29, whereby the vertical shaft 26 may be rotated to operate the stirring-blades in the lower portion of receptacle 15. This mechanism is sustained in the urn by supporting-means comprising a ring 30, having inwardly extending arms 31, a journal 32 for the upper end of shaft 36 and vertically extending arms 33 in which the horizontal shaft 29 is journaled. The supporting-ring 30 is adapted to rest on an inwardly extending annular shoulder 22$^a$ of the top ring 22, and is seated upon said shoulder by a keeper 34, ring 30 being provided with a notch 35, which permits the ring to be slipped under the keeper, so the latter will hold the ring firmly seated on the top ring 22. Stops 30' limit rotation of ring 30 to position shaft 29 to receive an operating handle. The outer end of shaft 29 terminates inwardly of the top ring 22, so that the stirring-device and its support may be conveniently removed from the receptacle 15 whenever it may be desired to use the urn without a stirring-device, for example, when the urn is to be used for making coffee as shown in Fig. 4 when a receptacle 36 for holding ground coffee will be suspended from a removable ring 37, which is also adapted to be held by keeper 34.

An operating handle for the stirring-device is provided and is detachably connected to shaft 29, which operates the stirring-device, so that the latter may be removed while the operating handle remains connected to the reservoir, and resultantly, the operating device may project laterally from the reservoir where it will be conveniently accessible for operation every time that a cup of chocolate is to be drawn from receptacle 15. This crank-handle 40 has a stem which is mounted in a journal 41, which is secured to the reservoir 13 by rivets 42 and contains a spring 43 for engaging a shoulder 44 on the stem 45 of crank 40 to press the crank normally inward. The inner end of the crank-stem 45 is squared, as at 46 or suitably formed to fit into a correspondingly shaped socket 47 in the outer end of shaft 29, thus providing a detachable or slip connection between the operating device and the stirring device, which permits the latter to be removed independently of the operating handle. A screw-collar 48 at the outer end of sleeve 41 provides a sliding and rotative journal bearing for the outer end of stem 45 and also serves as an abutment for the outer end of spring 43. When the handle 40 is drawn outwardly against the force of spring 43, the squared inner end 46 of the crank stem will be withdrawn from socket 47 in shaft 29 and will disconnect the crank from said shaft, so that the supporting-ring 30 and the stirring-device carried thereby may be rotated in the frame to bring notch 35 under keeper 34 when it will be free to be lifted from receptacle 15. To insert the supporting-ring and stirring-device, it is only necessary to pull handle 40 outwardly until the ring 30 has been slipped into position to bring shaft 29 into position to receive the inner end of the crank-stem 45 whereupon the spring 43 will force the stem inwardly into operative connection with said shaft. When the parts are in this position and the crank 40 is rotated, shaft 29 will be rotated thereby and the stirrers will be operated by means of the gearing between said shaft and the stirrers.

When the urn is used for chocolate, it is customary to provide a supply of hot milk to be added to the mixture drawn from the receptacle 15 and for this purpose a reservoir 50 having a base ring 51 adapted to rest on a shoulder 22$^b$ formed in top ring 22 is supported above the reservoir, so that sufficient heat from the hot-water reservoir will pass to the milk reservoir 50 sustained above the water-jacket. Milk-reservoir 50 is provided with a top 52 and a cock 53 whereby the milk may be withdrawn at will. This top 52 is adapted to fit on top of top-ring 22 when the milk receptacle is removed.

The invention thus provides an improved urn with a removable stirring-device and operating means for the stirring-device at the side of the urn, so that the stirring-device may be conveniently operated, and so that a milk reservoir may be sustained on top of the urn, when it contains the stirring-device. Furthermore, the urn may be quickly converted for use in making coffee or chocolate and is simple in construction.

The invention is not to be understood as restricted to the details shown and described, since these may be modified within the scope of the appended claims without departing from the spirit and scope of the invention.

Having thus described the invention, what I claim as new and desire to secure by Letters Patent, is:

1. An urn, comprising an outer jacket, an inner receptacle spaced therefrom annularly, a ring supported by one of said parts and closing the annular space between said jacket and receptacle at the top, and a stirring device removably supported by said ring.

2. An urn, comprising an outer jacket, an inner receptacle spaced therefrom annularly, a ring fixed to one of said parts and closing the annular space therebetween at the top, a removable ring supported by said fixed ring, means for locking said rings together, and a stirrer carried by and removable with said removable ring.

3. An urn, comprising an open-topped receptacle, a stirring device therein, a supporting ring in the top of said receptacle to which said stirring device is permanently connected, means for locking said ring in said receptacle, an operating handle for said stirring device mounted on said receptacle at the side thereof, and a detachable connection between said handle and said stirring device for permitting said stirring device to be disconnected from said handle.

4. An urn, comprising an open-topped receptacle, a stirring device therein, a removable supporting frame to which said stirring device is connected comprising a ring removably held in the top of the receptacle and notched in the side, a keeper on said receptacle adapted to enter said notch to hold said ring, gearing for said device mounted on said receptacle, and a detachable connection between said handle and said gearing.

5. The combination of an urn comprising an open topped receptacle, a stirring device therein, a removable supporting frame for said device, driving mechanism for said device mounted on said frame and embodying a horizontally extending arm, and a longitudinally movable spring pressed operating handle adapted to be normally forced inward to operatively engage said horizontal shaft.

SIGMUND MAYER.

Witnesses:
FRED GERLACH,
HILDUR C. PETERSEN.

---

Copies of this patent may be obtained for five cents each, by addressing the "Commissioner of Patents, Washington, D. C."